United States Patent [19]
Brevko et al.

[11] 3,739,547
[45] June 19, 1973

[54] SHRINK-WRAPPING METHOD AND APPARATUS

[75] Inventors: Robert Brevko, Peters Township, Washington County; Peter Viviano, Pittsburgh; Regis M. Rudman, North Braddock Borough; Lawrence D. Adams, Pleasant Hills Borough, all of Pa.

[73] Assignee: Auburn Engineering, Inc., Pittsburgh, Pa.

[22] Filed: Jan. 28, 1971

[21] Appl. No.: 110,684

[52] U.S. Cl. ..................... 53/182, 53/184, 53/230, 53/389
[51] Int. Cl. .......................... B65b 9/02, B65b 41/12
[58] Field of Search ................ 53/28, 182, 33, 228, 53/229, 230, 389, 373, 371, 372, 184

[56] References Cited
UNITED STATES PATENTS

| | | | |
|---|---|---|---|
| 3,490,194 | 1/1970 | Monaghan | 53/182 X |
| 3,406,494 | 10/1968 | Beck | 53/372 |
| 2,987,107 | 6/1961 | Sylvester et al. | 53/372 |
| 3,543,478 | 12/1970 | Von Brecht et al. | 53/182 |
| 2,697,473 | 12/1954 | Techtmann et al. | 53/373 X |
| 3,465,489 | 9/1969 | Monaghan | 53/182 X |
| 3,643,396 | 2/1972 | Togashi et al. | 53/182 X |

*Primary Examiner*—Robert C. Riordon
*Assistant Examiner*—E. F. Desmond
*Attorney*—Parmelee, Utzler & Welsh

[57] ABSTRACT

In a shrink film method and apparatus for enveloping successive articles in plastic film preparatory to shrinking it there are upper and lower rolls of film at one end of a shuttle frame on the pass-line through the machine and when these rolls are exhausted, the frame is moved crosswise and upper and lower rolls of film at the other end of the frame are then centered on the pass-line while replacement of the used ones from the first end is performed without interfering with the operation of the machine. Initially the ends of the upper and lower film sheets of the replacement rolls are joined together by a portable sealer before the frame is shifted to bring them into position on the pass-line. In the operation of wrapping the load or article to be wrapped is moved horizontally against the jointed ends of the upper and lower films and as its travel continues the lower sheet is pulled along under the load and the upper sheet is pulled over the top thereof. At the trailing end of the load seal-cut-seal bars seal the upper and lower film sheets at the trailing end sever both films and fuse the sheets together behind the line of cut, leaving them joined together across the path of the leading end of the load to be wrapped. After the front ends of the load, and preferably the entire load, has cleared the plane of the seal-cut-seal bars, the side margins of the top and bottom film sheets are folded into overlapping relation and are fused together, normally without any stopping of the machine.

17 Claims, 19 Drawing Figures

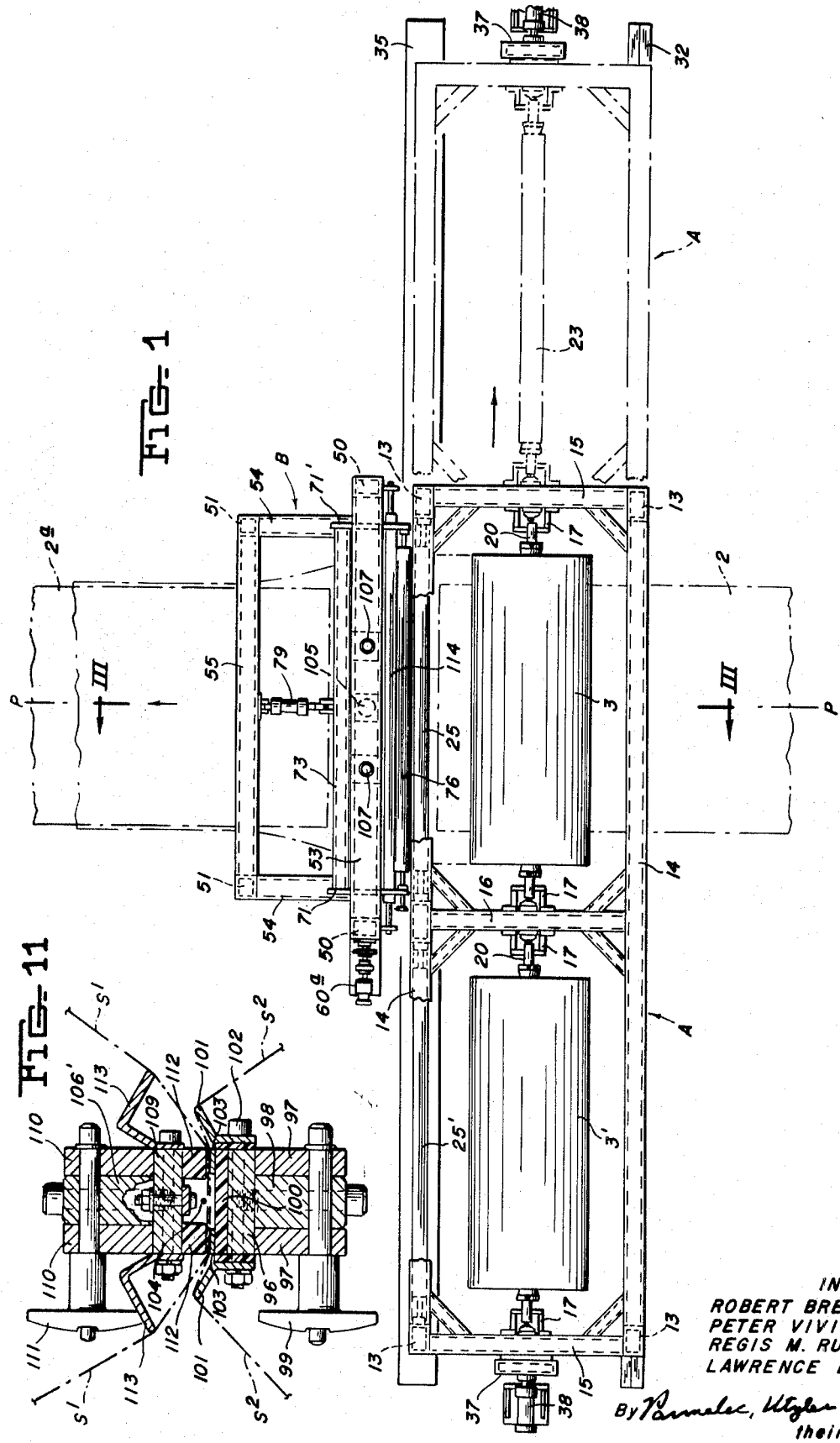

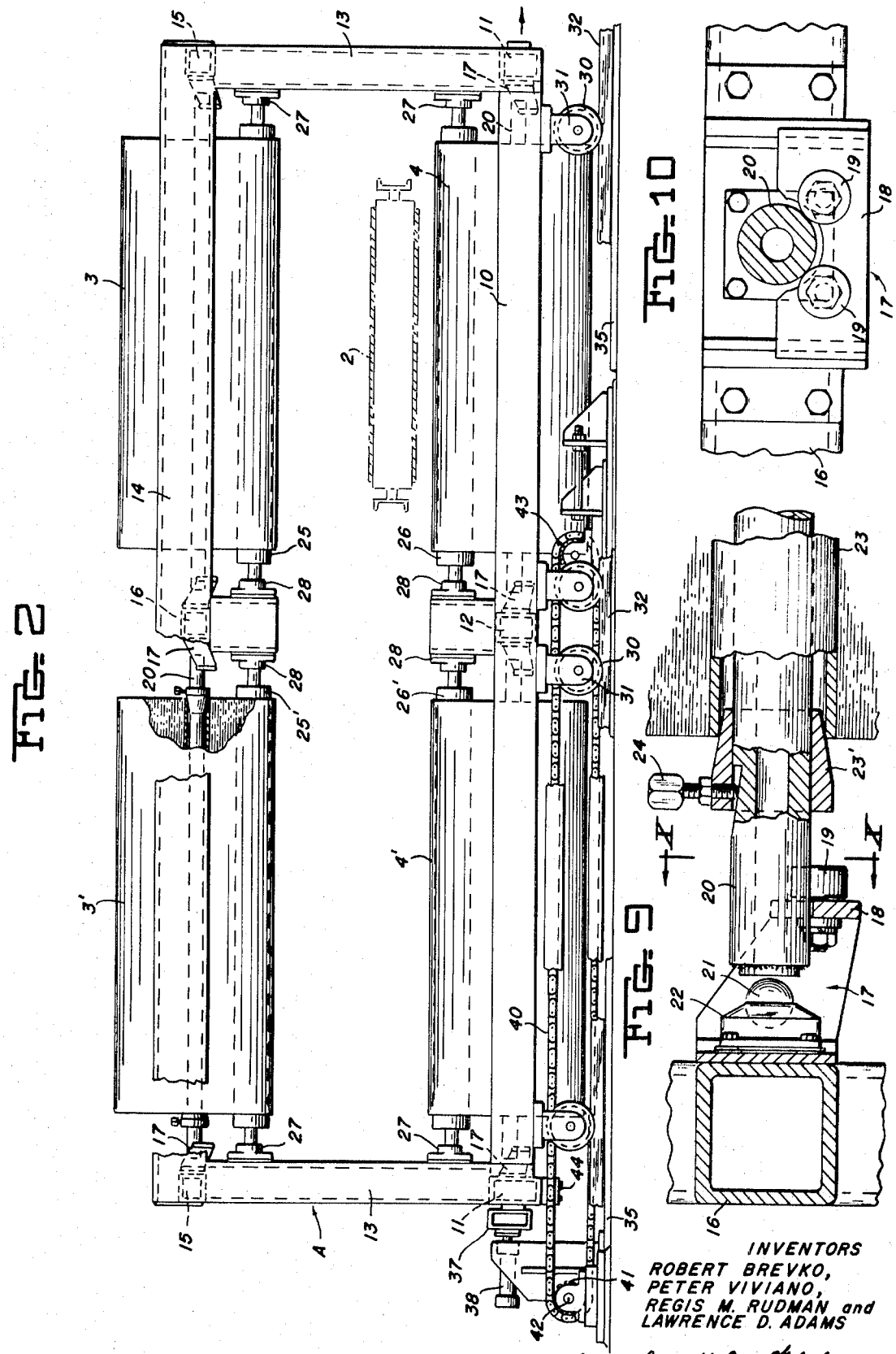

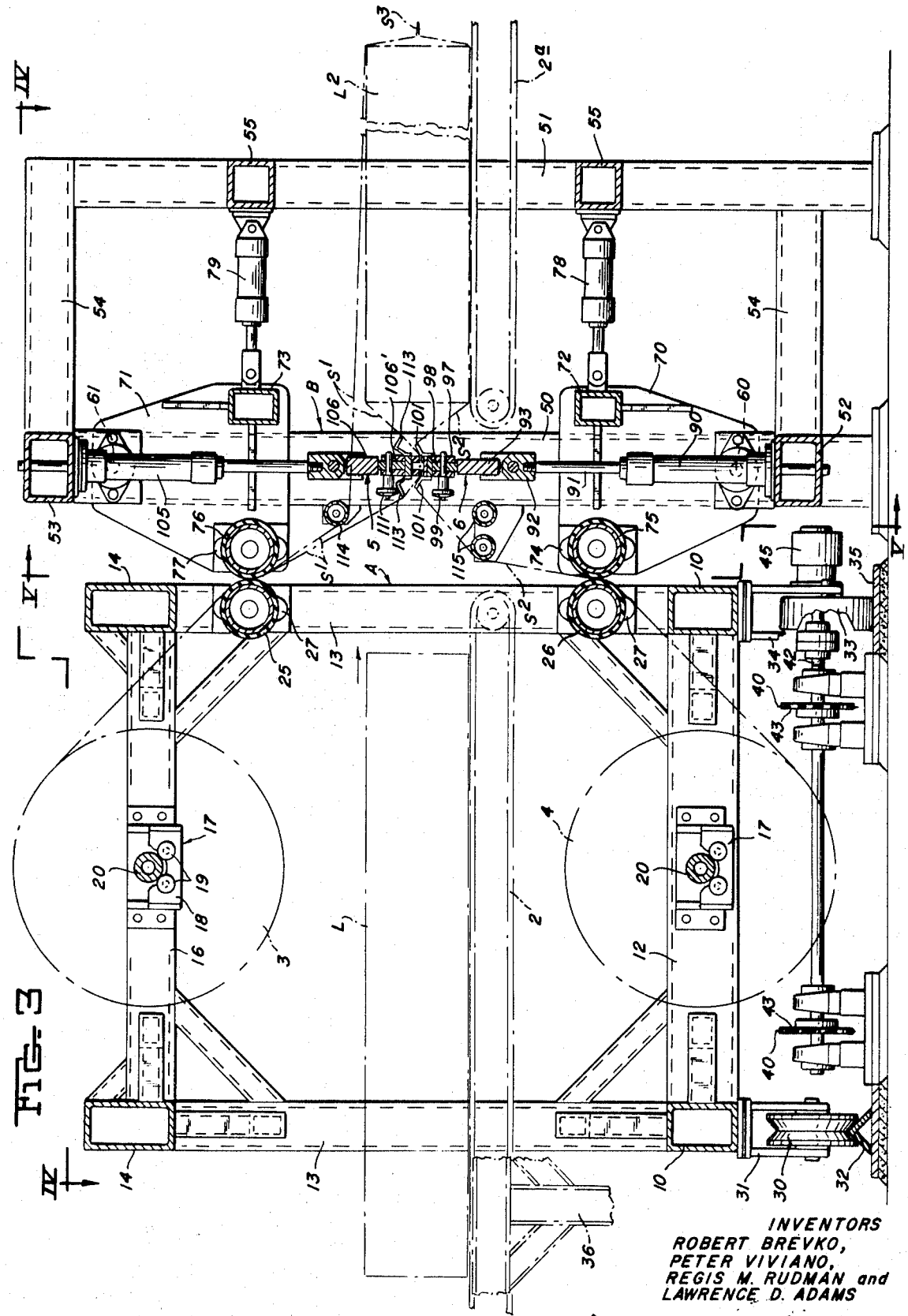

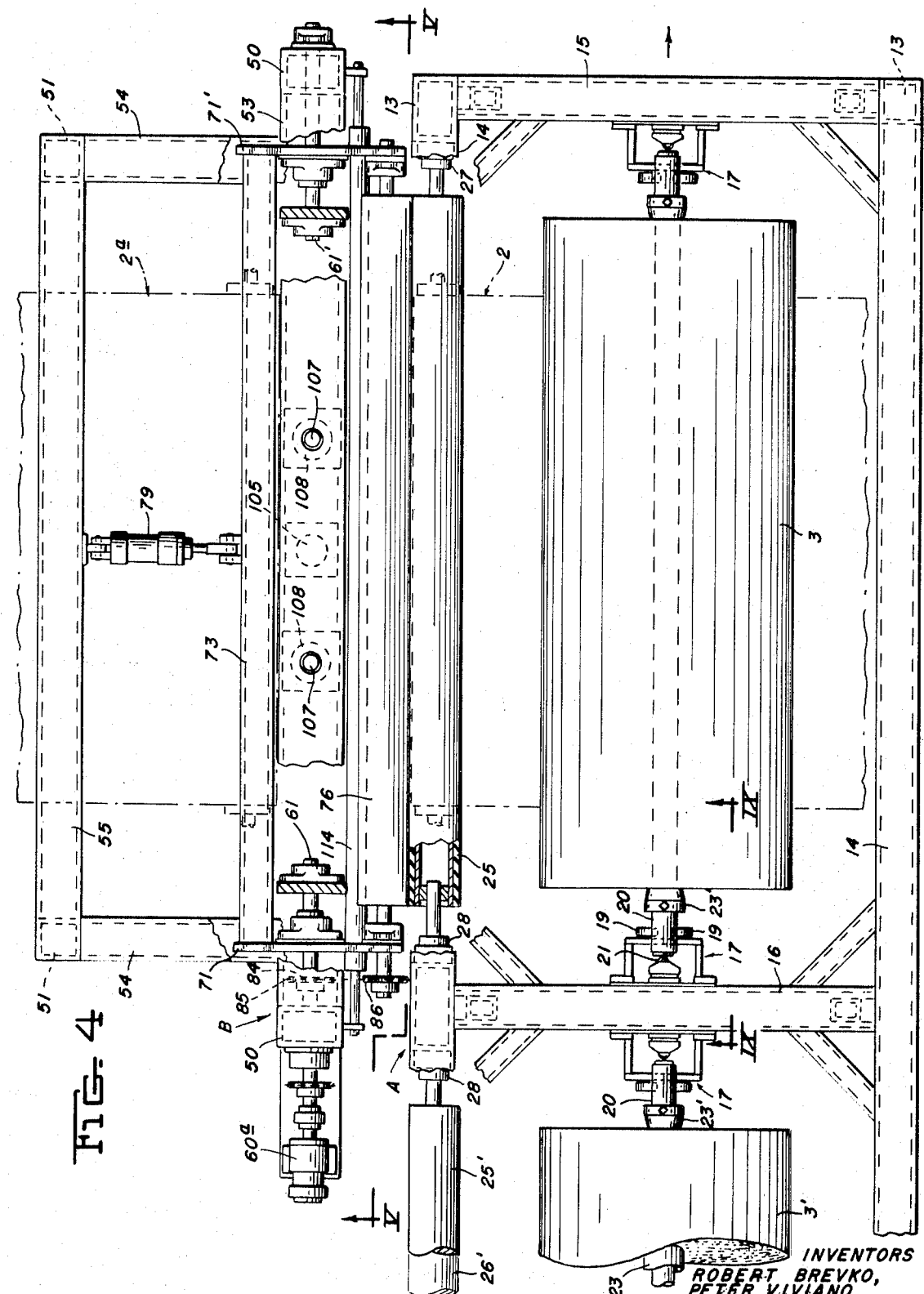

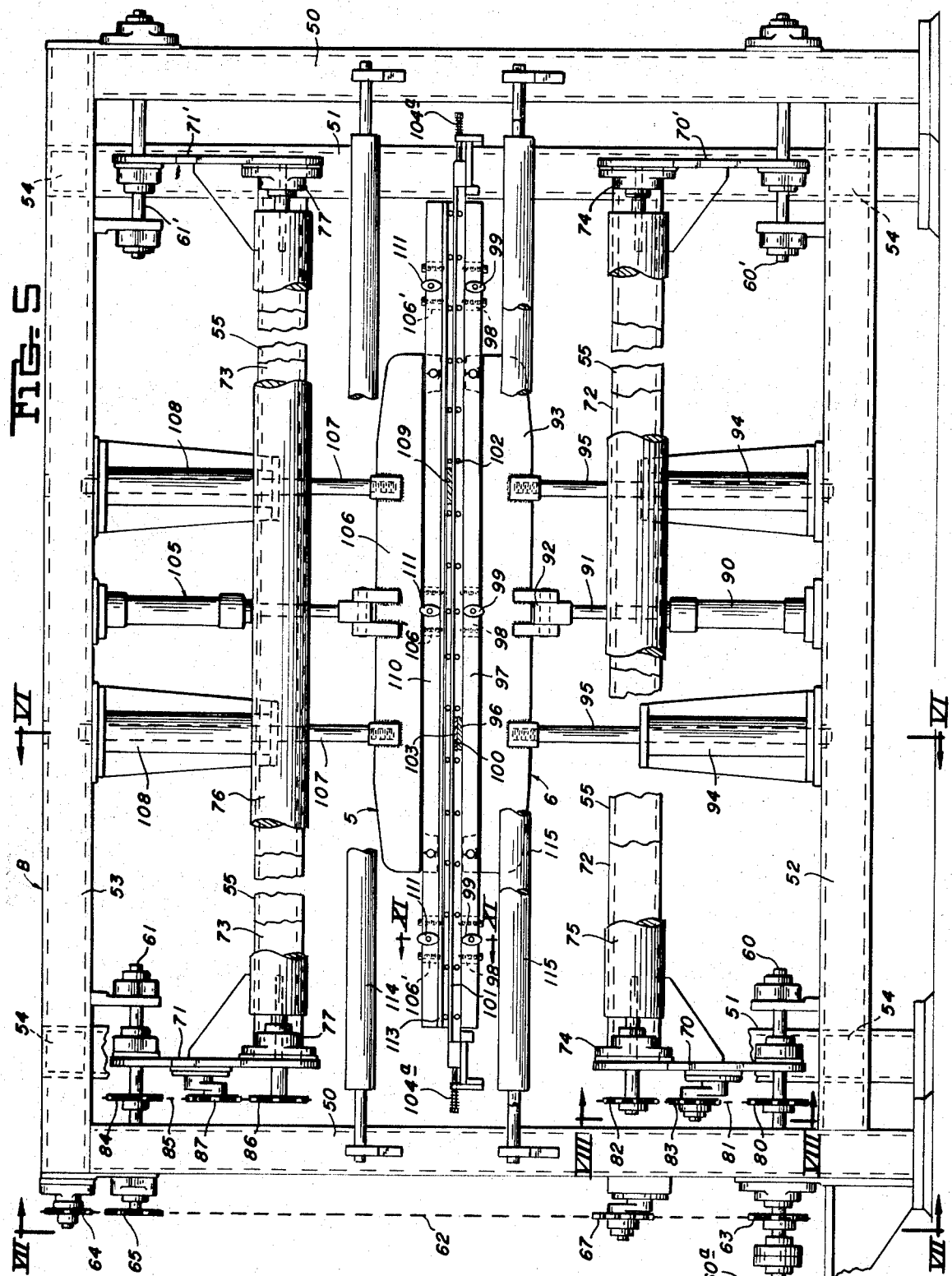

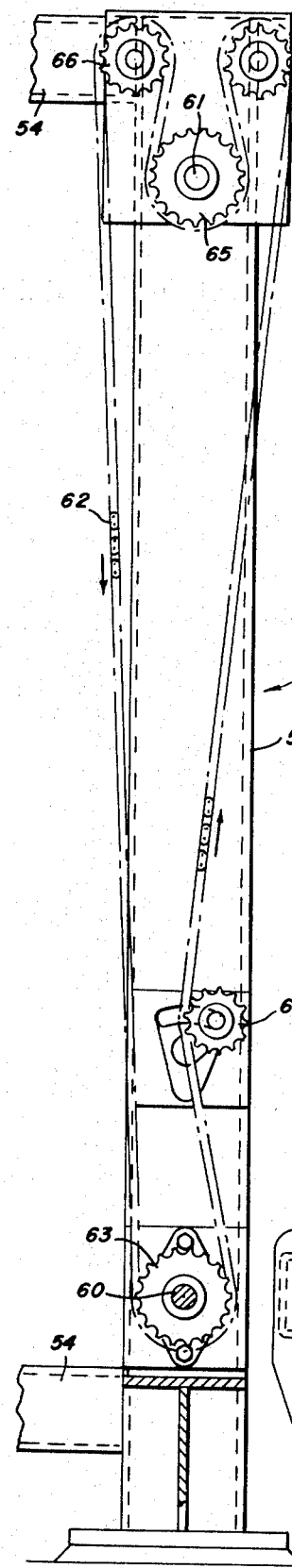
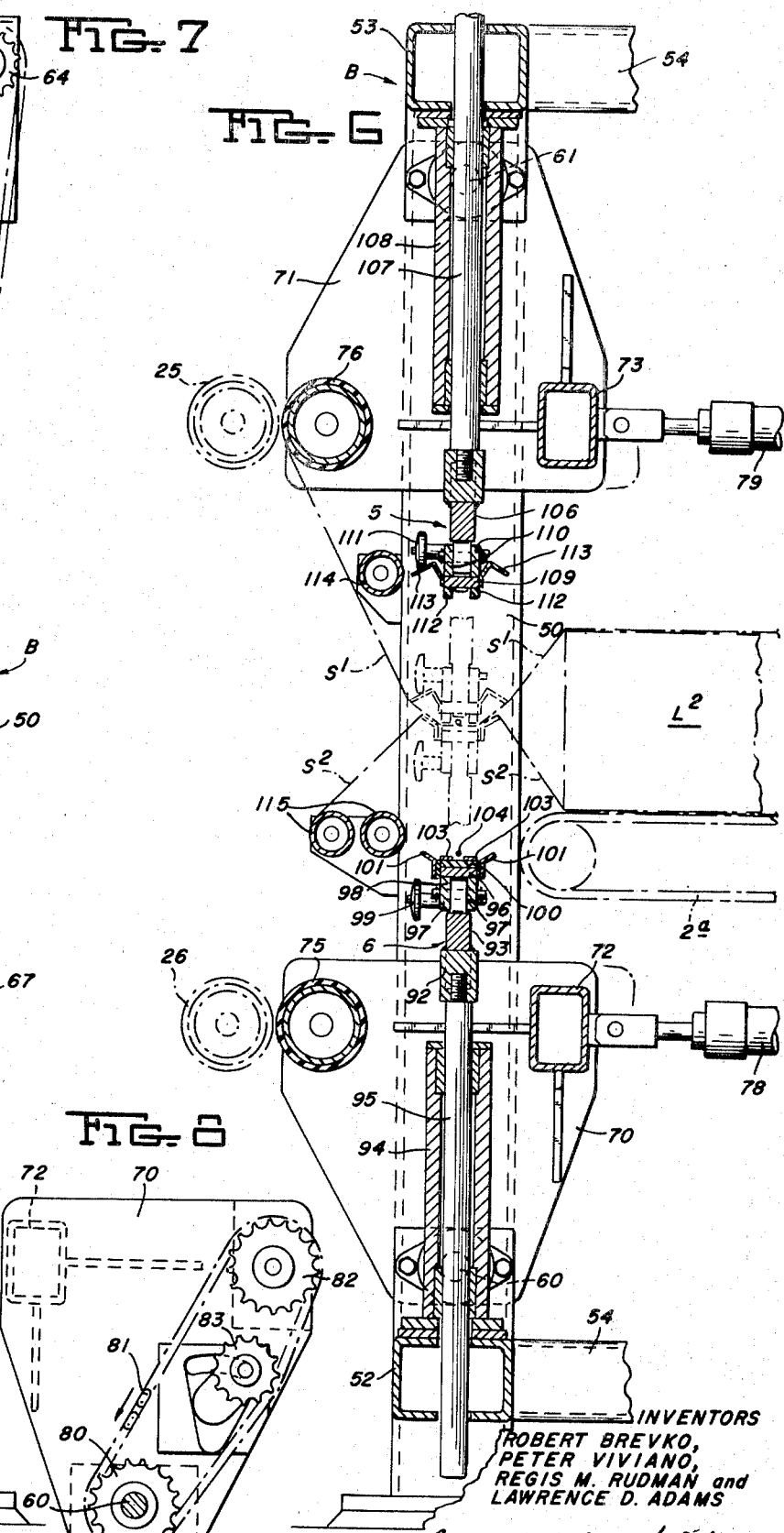

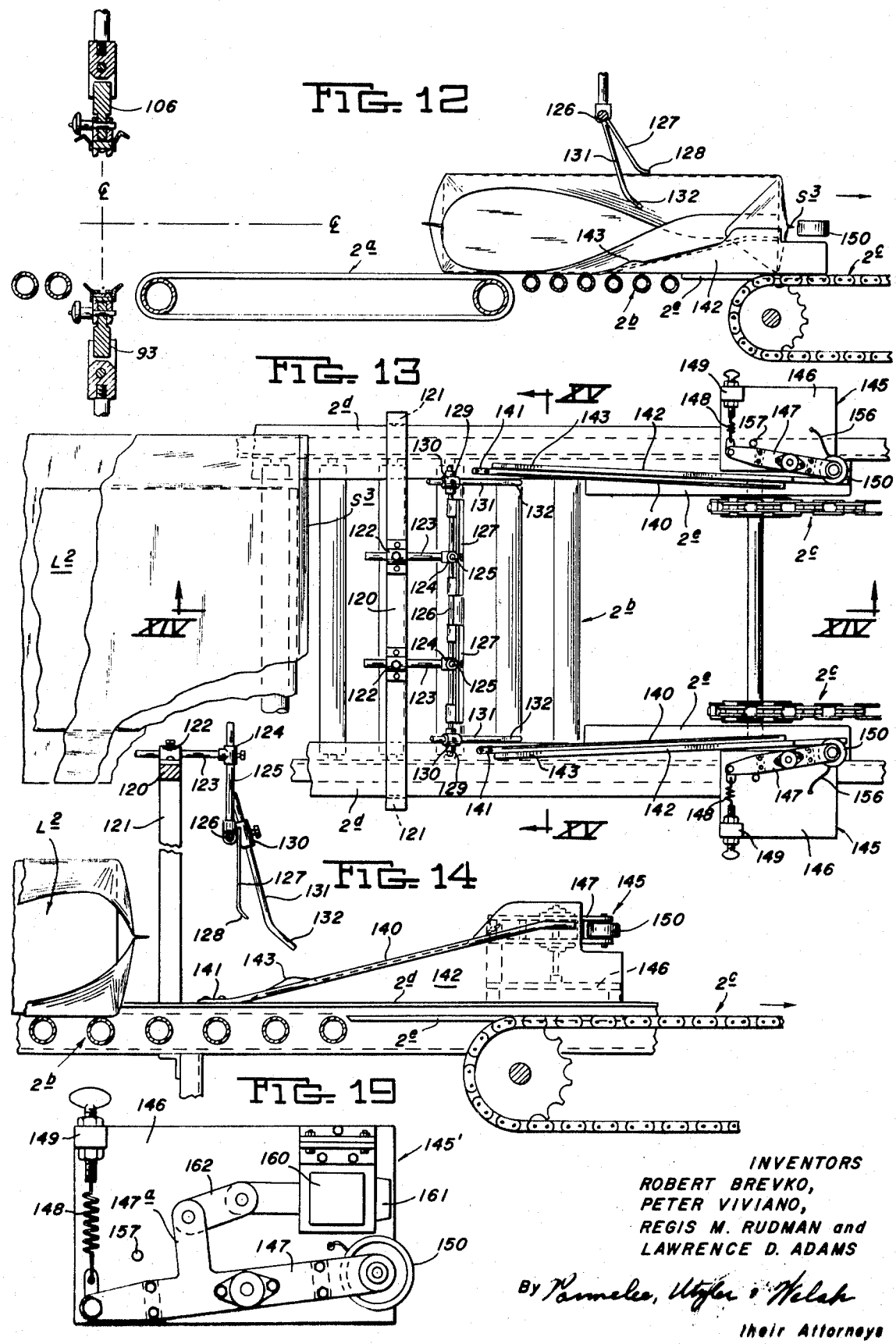

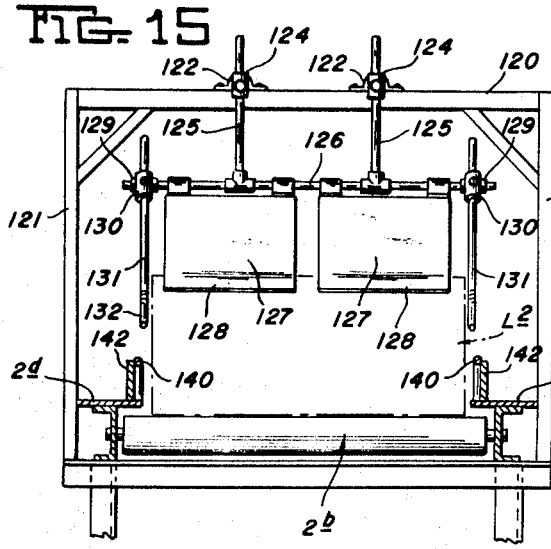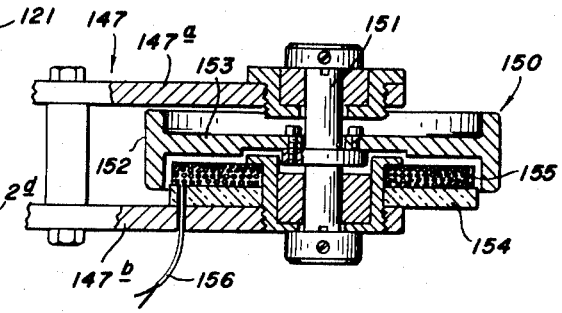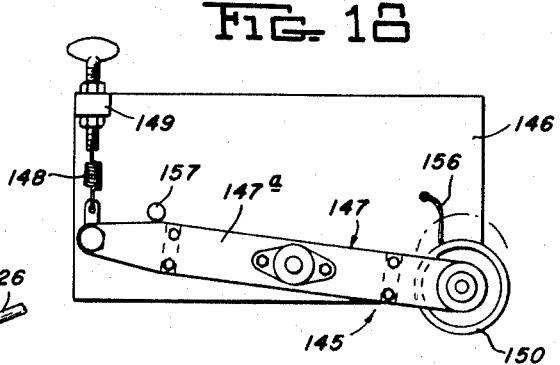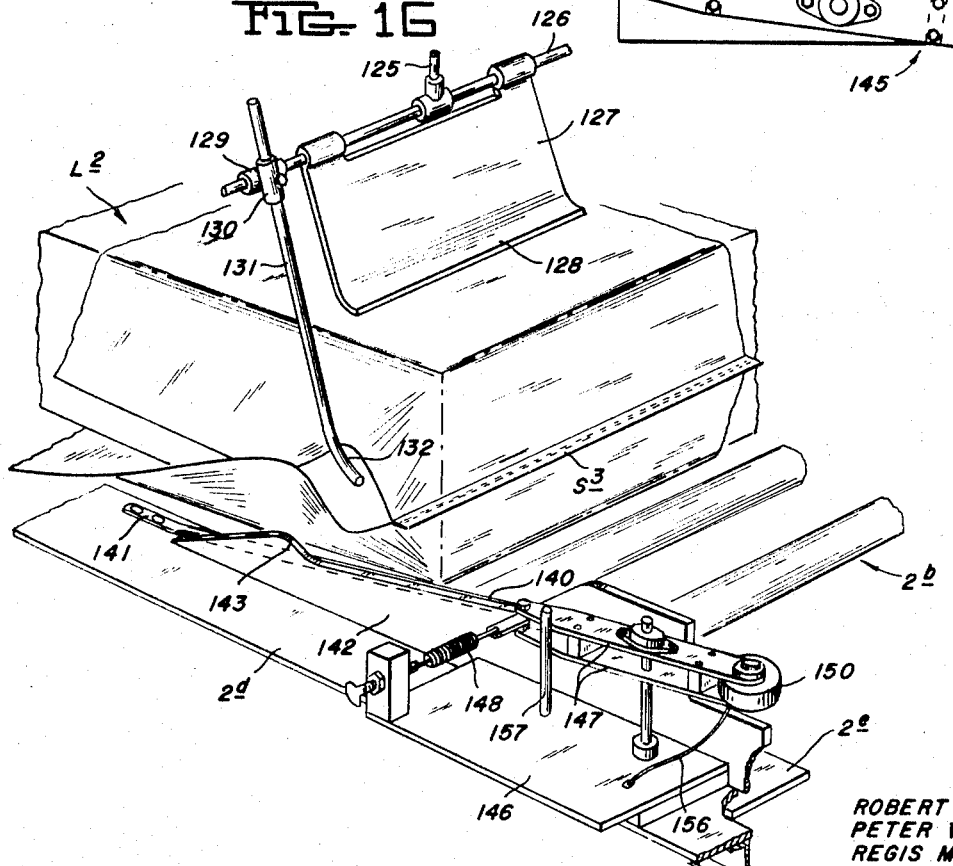

SHRINK-WRAPPING METHOD AND APPARATUS

This invention is for an improvement in the Shrink-Wrapping Method and Apparatus disclosed in Brevko, et al. application Ser. No. 55,890, filed July 19, 1970 and assigned to our assignee.

In the said application an apparatus is disclosed especially designed for shrink-wrapping relatively large, elongated loads or products wherein a roll of shrink-wrap plastic film is positioned at a level above the horizontal path of travel of the package to be wrapped and a second roll is positioned below the path of travel. The free ends of the two sheets are brought together and heat-seamed in the path of travel of the package to be wrapped so that as the package continues its forward travel, the heat seam will be at the front of the package and the sheet from the lower roll will be drawn out under the package and the one from the upper roll will be drawn out and drape over the top of the package. At the trailing end of the package, the two sheets are heat-seamed along parallel lines and severed between said parallel seams so that one heat seam will be at said trailing end of the package and the other seam will be ready for the next package. The top and bottom sheets at the sides of the package are then brought together and fused so that the package is ready for passage through a shrink tunnel.

While generally satisfactory in its performance, the machine had to be stopped for an appreciable time interval for the side seaming of each package, and this necessitated complete stopping of the conveyors that deliver the loads to be wrapped and that support the loads while the side seams were being tacked. This was accomplished by bringing the sides of the upper and lower sheets together and then tack-fusing them at spaced intervals along the overlap. In addition, the apparatus as therein disclosed presented considerable difficulty when it became necessary to replace the upper and lower rolls of sheet film, and this required a relatively long down-time, since the rolls are heavy and must be handled by a crane. The feeding of the sheet film from the rolls was accomplished by supporting the weight of the roll of film on the top of a power-driven roll, the rotation of the supporting roll serving to rotate and unwind the film sheet from the roll. A further improvement in the present apparatus is in the positive sheet feeding arrangement employing separate, by synchronized power driven pinch roll means for each of the two sheets.

BRIEF SUMMARY OF THE INVENTION

According to the present invention, the operations are integrated from one end to the other, the side seams being formed while the package is moving, the sheet material is fed from the rolls by power-driven pinch rolls, and the replacement of empty rolls with full ones entails only a few seconds of down-time. This is accomplished first by providing in the apparatus a transversely movable frame arranged to simultaneously hold two upper rolls of sheet film in axial alignment therein and two lower rolls in similar alignment under the corresponding upper ones. This frame is on a track so that it may be shuttled back and forth with respect to the line of travel of the package or load to be wrapped. Thus, when the upper and lower rolls of film at one end of the frame are exhausted, the frame may be shifted transversely to bring the other two rolls of one upper and one lower, into position and new rolls of film may be put in the frame in the place of the exhausted ones. This replacement of the rolls of film is done at one side or the other of the machine where it does not interfere with the continuous operation of the machine, and the only down-time is that required to move the frame from one position to the other. The initial fusing of the ends of the upper and lower rolls of film can be done as soon as the replacement rolls are placed in the frame, so that when the frame is next shifted the ends of the upper and lower film sheets will already be joined and no down-time is lost either in replacing rolls of film or initially joining their ends.

In addition, the present invention provides for the use of power-driven pinch roll units above and below the pass line of packages or loads to be wrapped through the machine whereby the sheet film may be pulled off the rolls at a controlled rate with a minimum of slippage. Provision is made for quickly spreading the pinch rolls of each pair apart when the shuttle moves a fresh pair of rolls of sheet film into position. This includes having a power-driven pinch roll of each pair fixed on the pass line through the machine but movable toward and away from the movable frame while the movable frame has an idle pinch roll in front of each upper film roll and a idle-pinch roll in front of each lower film roll. In this way each power driven pinch roll is paired with one of the two idle-pinch rolls on the movable frame.

There is a fast-acting mechanism for sealing the two film sheets transversely by forming two closely-spaced parallel seams and severing them between the two parallel seams, one of said two seams being at the trailing end of one package and the other in a position to be at the leading end of the next package.

Finally there is provided a side-seaming device along each side of the path of travel of the package over which the film has been or is being placed that brings the side margins of the upper and lower films together in overlapping margins continuously as the package is carried along the conveyor. Usually the side sealing apparatus is located some distance beyond the seal-cut-seal bars so that the wrapped load is entirely clear of them before the side sealing beings and therefore it is unnecessary to stop the operation when the seal-cut-seal bars are closed. Only in exceptional uses, as where there is not sufficient space and the package is too long, will it be necessary to locate the side sealer so close to the seal-cut-seal bars that side sealing along the leading end of the package is taking place before the trailing end has cleared these bars. In such case the side sealing operation and travel of the package must be stopped for the few seconds that the seal-cut-seal bars are closed.

BRIEF DESCRIPTION OF THE DRAWINGS

The invention may be more fully understood by reference to the accompanying drawings showing a present preferred embodiment of the invention, and wherein:

FIG. 1 is a top plan view of the machine with the load-delivery and receiving conveyors being schematically indicated in broken lines;

FIG. 2 is a front elevation of the machine with the delivery conveyor being schematically indicated in section;

FIG. 3 is a transverse section in the plane of line III—III of FIG. 1 with the load-delivery conveyor and the load-receiving conveyor being schematically indicated in broken lines;

FIG. 4 is a top framgentary view, partly in section, in the plane of line IV—IV of FIG. 3, showing on a larger scale and in more detail part of the apparatus as seen in FIG. 1;

FIG. 5 is a transverse vertical section in the plane of line V—V of FIG. 3;

FIG. 6 is a fragmentary transverse section showing part of the apparatus as seen in FIG. 3 but on a larger scale, the section being in substantially the plane of line VI—VI of FIG. 5;

FIG. 7 is a fragmentary side elevation and section in the plane of line VII—VII of FIG. 5 showing the driving arrangement for the pinch rolls;

FIG. 8 is a fragmentary vertical section showing the reverse face of the lower portion of the apparatus as seen in FIG. 6, the view being in the plane of line VIII—VIII OF FIG. 5;

FIG. 9 is a fragmentary detail view partly in section and partly in elevation of the bearing for the plastic sheet roll shaft and roll mounting;

FIG. 10 is a transverse section in the plane of line X—X of FIG. 9;

FIG. 11 is a fragmentary transverse sectional view of a part of the apparatus as seen in FIG. 3, but on a larger scale, the view being a section in the plane of line XI—XI of FIG. 5 showing the upper and lower seal-cut-seal bars;

FIG. 12 is a somewhat conventional side elevation showing the conveyor arrangement beyond the seal-cut-seal bars and including the side sealing apparatus;

FIG. 13 is a similar plan view on a larger scale of the right end of the apparatus shown in FIG. 12;

FIG. 14 is a fragmentary side elevation of that part of the apparatus shown in FIG. 13 and on a larger scale than FIG. 12;

FIG. 15 is a transverse vertical section in the plane of line XV—XV of FIG. 13;

FIG. 16 is a detail view in vertical view showing the side sealing arrangement at one side of the machine;

FIG. 17 is a detail view in vertical section showing the construction of the heated side seaming roll;

FIG. 18 is a detail plan view of one form of heated side sealing roller and its mounting for use in a continuously running machine; and FIG. 19 is a detail plan view of an alternate arrangement to that shown in FIG. 18 for use where the travel of the load may be interrupted during the side sealing operation.

In the drawings, corresponding reference numerals designate corresponding parts throughout. The general arrangement is similar in its overall plan to that disclosed in said copending application, in that an article or loads or packages or articles L-to be wrapped are brought in succession by a delivery conveyor 2 to a position between an upper roll of plastic sheet-wrapping material 3 and a similar lower roll 4. As shown in FIG. 3, a preceding load or package L2 has just passed from the delivery conveyor onto a receiving conveyor 2a at a time when these bars were opened, as hereinafter described.

As viewed in FIG. 3, the trailing end of the load L2 has cleared the bars 5 and 6 and these bars closed in the seal-cut-seal film sealing and cutting operation to seam the upper plastic sheet S1 and the lower plastic sheet S2 together at the trailing end of the package, sever it following the seam, and make a second seam to rejoin the film sheets for the leading end of the next load L. After the seal-cut-seal operation, the bars 5 and 6 opened to let the lead end of the next load L move against the rejoined ends of the two sheets and repeat the operation. As each new package L moves through the seal-cut-seal bars from one conveyor onto the other, the shrink-wrap film at the sides of the preceding package L2 will have been brought together and seamed by means which may be like that shown in the said copending application, or preferably by other means as hereinafter described, and the wrapped package is then moved out of the way for transfer to a shrink tunnel.

Since the present invention is primarily designed to wrap large loads or objects, the rolls of film are rapidly depleted and an important aspect of this invention relates to the replacement of the rolls of sheet film and the feeding of the film from the rolls to seal-cut-seal bars 5 and 6. In this connection it is easily seen in FIG. 3 that the upper and lower rolls of shrink film 3 and 4 are supported in a rigid frame structure designated generally as A. It will also be seen that the sealing bars 5 and 6 and accompanying mechanisms are on a separate rigid frame structure designated generally as B.

Referring first to FIGS. 1, 2 and 3, the frame A as viewed from the top (FIG. 1) and from the front (FIG. 2) is generally rectangular and is of an overall length greater than that length of two rolls of film in end-to-end relation, so that in addition to the upper and lower rolls of plastic 3 and 4 as seen in FIG. 3, there are other similar rolls of film 3' and 4' in end-to-end alignment with the upper and lower rolls 3 and 4, respectively.

The frame is comprised of two spaced, parallel lower longitudinal beams 10 connected at their ends by cross members 11 and at the center by a cross member 12. There are four upright corner posts 13, one at each end of each long beam 10, and there are long parallel upper beams 14 parallel with the corresponding lower beams 10. There are cross members 15 at each end of these upper beams 14, and there is a cross beam 16 midway between the ends of the beams 14 and connecting them, this cross member 16 being directly above the cross member 12 which connects the lower beams 10. It will be seen, particularly by reference to FIG. 2, that the two upper beams 14 comprise long upper span supported only at its ends, leaving the space between the upper rolls 3 and 3' and the lower rolls 4 and 4' clear of any intermediate supporting structure. Also, as best seen in FIG. 1, the top of the rectangular frame is open between the beams 14, except for the cross member 16.

The lower middle cross member 12 and the corresponding upper cross member 16 have similar bracket-like fixtures 17 projecting laterally from the center of each face thereof, these being bearing brackets shown in greater detail in FIGS. 9 and 10. Each bracket has an end plate 18 that is notched at the center, and at each side of the notch there is a roller 19. There are similar bracket-type bearings on the inner faces of each of the end cross members 11 at the bottom of the frame and 15 at the top of the frame, the bearings on the end members being in horizontal and vertical alignment with those on the lower and upper central cross members 12 and 16, respectively, providing bearings for the other ends of the respective roll shafts 20.

There is also a single ball bearing 21 in a retainer 22 associated with each bearing bracket with the ball 21 centered at the end of each roll shaft 20 for confining the shaft against end play while enabling the shaft end to be lifted vertically out of the bearing bracket or positioned thereon. As shown in FIG. 9, each roll of plastic sheeting has a core 23 through which the shaft 20 extends with the ends of the shaft projecting beyond the ends of the core. A centering cone 23' slidably keyed to each shaft end with a set screw or bolt 24 centers the core of each end of each shaft.

With the roll and shaft arrangement just described, it is an easy matter to lift any shaft out through the top of the frame and lower another one with a roll of film thereon into position with a fork-lift, a crane or other lifting or hoisting means.

The frame A also has four idler pinch rolls supported therein to one side of the axis of the shafts 20, two upper ones 25 and 25' being below the axes of the upper film rolls 3 and 3', and the two lower ones 26 and 26' being above the axes of the lower film rolls 4 and 4'. Each of these four pinch rolls has a bearing 27 at one end in one of the vertical columns 13 and their opposite end in a bearing 28 carried by the beams 10 and 14, respectively, midway between the ends of said beams. As seen in FIG. 3, these four pinch rolls are at that side of the frame A which confronts the frame B.

One of the lower beams 10 has wheels 30 thereunder in fixed bifurcated blocks 31. As best seen in FIG. 3, these wheels have a concave or angularly-recessed periphery to ride on and conform to the angular rail 32 to guide the frame A as it moves along the track. The other beam 10 has wheels 33 thereunder in blocks 34, these wheels having flat peripheries to ride on a flat track or strip 35.

With the construction as here described, the frame A, arranged to support two upper rolls of film and two lower rolls, can be moved transversely with respect to the frame B and the delivery and receiving conveyors 2 and 2a, respectively. The delivery conveyor 2, as seen in FIG. 3, is supported at 36, outside the path of movement of the frame A and FIG. 2 shows clearly that the frame and conveyor are mutually clear of each other to enable such movement to be effected. The range of movement of the frame A is from the full line position where plastic sheet rolls 3 and 4 are centered on the pass line P—P through the machine to the broken line position when in FIG. 1 where the other two rolls 3' and 4' are centered on this pass line.

There is an abutment 37 at each end of the limit of travel of the frame A, each of which has a shock absorber, preferably of a linear deceleration type 38 thereon to cushion the stopping of the movable frame as it reaches one limit or the other of its travel.

Travel of the carriage is effected by parallel endless chains 40 located on the foundation between the rails 32 and 35, each chain passing around a sprocket 41 on a driven shaft 42 and idler sprockets 43. The lower cross member 11 at the left end of the frame A as viewed in FIG. 2 is attached to the upper reach of this chain at 44. The reversing drive motor and speed reducer if necessary for the shaft 42 is indicated at 45 (FIG. 3) but the usual limit switches and reversing control are not shown in FIG. 1, the empty cores of the two rolls at the broken line position may be removed and replaced with new rolls of plastic sheet 3 and 4 while the plastic sheet is then being used from rolls 3' and 4' so that the only loss of time is that required to move the frame. When rolls 3' and 4' are exhausted, the frame A is rolled back to the full-line position shown in FIG. 1, where the emply cores at the other end of frame A are replaced with new rolls of plastic sheet wrap. Alternating in this way, little time is lost due to replacing the rolls of plastic film, since the apparatus can work while rolls are being replaced at one side or the other of the pass line.

Unlike the frame A, frame B is fixed. It, too, is rectangular when viewed from the top, the front or the end. It has four vertical corner posts, those at the front being designated 50, and those at the rear 51. Horizontal beam 52 connects the two posts 50 near their lower ends and beam 53 connects these two beams at the top. Beams 52 and 53 are parallel with but spaced from beams 10 and 14 respectively of frame A. There are cross members 54 connecting the tops and bottoms of the front corner posts 50 and the rear corner posts 51. Upper and lower horizontal beams 55 connect the two rear corner posts 51.

As best shown in FIG.5, there is a drive shaft 60 near the lower end of the left corner column 50 (as seen in this figure), and above the lower beam 52. Directly above this shaft near the top of column 50, but below the beam 53, there is a generally similar shaft 61. A most clearly shown in FIb. 7, a drive chain 62 passes around sprocket wheel 63 on the lower shaft 60, around idler 64 at the top of column 50, down around sprocket wheel 65 on shaft 61, then around idler 66. Sprockets 63 and 65 are of the same size so they both operate at the same speed. A slack take-up or chain adjustment is provided at 67.

In line with shaft 60 on the right side of the frame as viewed in FIG. 5, is a supporting shaft 60' and in line with the upper shaft 61, but at the opposite side of the frame, there is a supporting shaft 61'. There is a rocker plate 70 pivoted on shaft 60 and opposite it there is a similar rocker plate 70', these plates being free to oscillate through a limited arc in a vertical plane. Likewise there is a rocker plate 71 depending from the upper shaft 61 and a similar plate 71' depending from shaft 61'.

The several rocker plates are arranged to be oscillated through a limited arc about the shafts on which they are carried. The opposed lower plates 70 and 70' are connected by a rigid cross bar 72 and the two upper rocker plates 71 and 71' are similarly connected by a rigid cross bar 73. The two lower rocker plates 70 and 70' have bearings 74 thereon for a power-driven lower pinch roll 75 that spans the distance between these plates, and which is in confronting relation with one of the idler lower pinch rolls 26 or 26' in the movable frame A, depending on which side of the frame A is centered on the pass line (see FIG. 3).

There is a corresponding upper power-driven pinch roll 76 extending between upper rocker plates 71 and 71' and supported in bearings 77 on the confronting faces of these plates. This upper pinch roll 76 is in confronting cooperating relation with one of the idler upper pinch rolls 25 or 25' of frame A. For moving the lower pinch roll 75 into and out of operating pressure against roll 26 there is a fluid pressure operated cylinder and piston unit 78 pivotally anchored to the center of lower fixed cross bar 55 and also pivotally connected with the middle of cross bar 72 which connects the lower rocker plated 70 and 70'. A similar cylinder and piston unit 79 is similarly arranged between upper fixed cross bar 55 and the center of cross bar 73 which connects the two upper rocker plates 71 and 71' By operation of these cylinder and piston units the rocker plates can be oscillated to hold the respective pinch rolls against the opposite matching rolls on the frame A, or to be backed away from said matching rolls.

The purpose of the upper and lower pairs of pinch rolls is, of course, to pull the continuous strip sheet plastic from the respective upper and lower rolls, and, therefore, the pinch rolls 75 of the lower pair and 76 of the upper pair are driven in unison. Power-driven shaft 60 has a sprocket wheel 80 alongside rocker plate 70, and a chain 81 (Se FIG. 8) passing around this sprocket wheel 82 on the end of the shaft of pinch roll 75 transmits power from shaft 60 to the pinch roll. A chain tension adjustment is indicated at 83 for the chain 81.

As previously explained, power is transmitted from shaft 60 through chain 62 to the upper shaft 61 and a similar drive comprising sprocket wheel 84 on shaft 61, chain 85 and sprocket wheel 86 on the end of the shaft for upper pinch roll 76 transmits power to this upper pinch roll. There is a chain tension adjuster 87 similar to 83. The drive motor and speed reducer if necessary for shaft 60 is indicated at 60a (See FIGS. 1, 4, and 5).

Since lower rocker plate 70 oscillates about shaft 60 on which sprocket wheel 80 is also fixed, and plate 71 oscillates about shaft 61 on which sprocket wheel 84 is fixed, the oscillation of the rocker plates 70 and 71 as hereinbefore described does not affect the length of the drive chains 81 and 85, and the driven pinch rolls 75 and 76 can be moved away from the matching pinch rolls on frame A when frame A is to be shifted and the ends of new rolls of sheet film are to be threaded between the alternate pinch roll arrangement. Having one pinch roll of each pair on the frame A and the other one of each pair on frame B, and providing for movement of the rolls on frame B toward and away from the ones on frame A is unique, and the use of power-driven pinch rolls to unwind the sheet from the supply rolls at a uniform rate of speed is one of the important advantages of this invention.

The frame B also provides means for sealing the ends of the sheets at the trailing end of a package, the cutting off and the forming of a second seam to be engaged by the leading end of the next package or load to be wrapped. This seal-cut-seal arrangement is also positioned between the two forward corner posts of frame B and is supported primarily on lower cross-beam 52 and upper cross-beam 53. It is centered on the pass line of the travel of the loads to be wrapped through the apparatus, and is located between the discharge end of delivery conveyor 2 and the receiving end of conveyor 2a.

Referring particularly to FIGS. 3, 5, and 11, there is a fluid pressure cylinder 90 on the center of lower beam 52 of the frame B. It has a piston with a piston rod 91 that has a clevis-like element 92 at its upper end attached to a carrier bar 93. At each side of the cylinder-piston unit 90–91, but spaced therefrom, is a guide cylinder 94 and guide rods 95 attached to the carrier bar 93 slidably fitted into these guides for holding the carrier bar in a vertical plane transverse to the pass-line through the machine as the carrier bar is raised and lowered.

The carrier bar has parallel spaced strips 97 bolted thereto at intervals therealong. There is rigid flat bar 96 on top of the strips 97 and its has two or more lump or blocks bolted to the under face thereof, three of these lugs being shown. The lugs 98 fit between parallel strips 97. There is quick removable push pin 99 that passes through registering holes in the strips 97 and lug 98 for releasesably holding flat bar 96 in place, there being ony push pin at each lug.

There is a layer 100 of heat resistant insulation, such as TFE over the top of the bar 96 and extending down each side of it. There are upwardly and outwardly-extending plastic film sheet support strips 101 along the sides of bar 96 to guide the film and protect it. Trough-bolts 102 with nuts hold these strips and the plastic insulation in place. On top of the insulation strip 100 there are transversely-spaced parallel flat electric resistance heater strips 103 substantially coextensive with the length of bar 96. There is a TFE coated tape (not shown) over these heaters to preclude the heat softened film for adhering thereto. Between them and slightly elevated above them is a resistance heater wire 104 also coated with TFE or like resin to which the melted film will not adhere. Terminals (not shown) are provided at opposite ends of the strips heaters 103 and the wire 104 to which a heating current may be applied to these elements. Tensioning means 104a for the hot wire are indicated at each end of the bar 96. As will be hereinafter more fully explained, wire 104 is operated at a higher temperature than strips 103 since the former will cut the film sheets by melting them, while strips 103 provide only sufficient heat to seam two sheets together.

Directly above the lower bar assembly just described there is a cooperating upper bar assembly of a generally comparable structure, but which does not have any resistance heater elements thereon. On the center of the upper beam 53 there is a depending cylinder and piston unit 105, the piston rod of which is connected with a carrier bar 106. There are guide rods 107 at each side of and spaced from the cylinder and piston unit that operate in guides 108, the arrangement so far being a "mirror image" of the parts below. The carrier bar 106 has spaced side strips 110 secured thereto and there is a rigid flat bar 109 engaged against the lower edges of these strips. The bar 109 has upstanding blocks or lugs 106' bolted to the top thereof. Push pins 111 passing through bars 110 and lugs 106' releaseably hold the bar 109 on the carrier for fast removal and replacement.

The lower face of the strip 109, that is the face which confronts the heater strips 103, has paralled spaced heat-resistant resilient strips 112 therealong, so located that when the upper and lower assemblies are together as shown in FIg. 11, the strips 112 could press against the heater strips 103 except that the plastic sheets indicated by the broken lines come in between them. Guard strips 113 are attached to the sides of the rigid strips or bar 109.

The upper and lower assemblies just described are substantially coextensive and the length of the rigid bars 96 and 109 are greater than the width of the plastic wrapping sheets. The remainder of this part of the apparatus comprises and upper guide roller 114 supported on the uprights 50, and two lower guide rollers 115 in horizontal side-by-side relation, as shown in FIGS. 5 and 6.

OPERATION

The general operation of the apparatus has been heretofore indicated. It may be assumed that the parts are in the position shown in FIG. 3. The upper and lower film sheets S1 and S2 are seamed together as indicated at S3 at the front of the 1 load L2 and the load L2 has been carried by a conveyor 2a to the position where its trailing end is clear of the path of the upper and lower vertically-movable sealing bar assemblies, and these assemblies have come together, pushing the upper sheet S1 down and the lower sheet S2 up to the level of the mid-plane of the load where the two sheets are pinched together, with resilient strips 112 on the upper assembly confining the two sheets against the heated sealing strips 103 of the lower assembly to fuse them together while the hot wire 104 substantially simultaneously severs the sheets between the two seams. The fluid pressure units, air or liquid, 90 and 105, are so designed as to bring the bar assemblies together and press against each other at the level of the mid plane of the load. At the same time the pinch rolls feed both sheets toward a point of juncture where the sealing bars meet. The closing and opening of the sealing bars is fast and takes place within a few seconds. The load L2 will then be seamed at both ends.

There is a side sealer unit hereinafter described positioned somewhere along the receiving conveyor preferably beyond the section of the receiving conveyor designated 2a and alongside the section of the receiving conveyor marked 2c as hereinafter described. This sealer will operate as the load is being moved along the conveyor 2a. The conveyors 2 and 2a are normally driven at the same speed either by a chain drive arrangement somewhat as shown in said copending application, or by synchronous drives and the upper and lower pairs of pinch rolls operate when the leading end of the package reaches the joined plastic sheets to unwind the plastic sheets at the same linear speed as the package, and both sheets and the load being wrapped travel at the same speed.

In this manner the cycle repeats and both rolls of sheet plastic 3 and 4 will be used at the same rate. When they are exhuasted, or about exhausted, the driven pinch rolls are simultaneously retracted by operation of their respective cylinder and piston units 78 and 79, whereupon drive chain 40 is operated to move frame A transversely to the pass line through the apparatus to bring rolls 3' and 4' into operative position. The lead ends from these two sheets will already have been draped over their respective idle pinch rolls 25' and 26' and sealed with a portable sealer so that when the frame A has come to a stop at the limit of its travel, the two sheets will be fused and ready to operate as soon as the upper and lower movable pinch rolls on frame B are returned to operative position where they press against the then confronting pinch rolls in frame A. Thereupon the operation of the machine may be resumed. The pinch rolls preferably all have a rubber or rubber-like surface so that they effectively grip and pull the plastic sheeting with no slippage. Once the operation has started, the machine may operate continuously until it is time to change rolls of film, or because of some delay in providing articles to be wrapped in proper spaced sequence to the delivery conveyor 2.

SIDE SEALING

The side sealing of the film sheets is performed after the leading end, and preferably after the top and bottom sheets, already sealed together at the leading end of the package, are also sealed at the trailing end. The reason is that if the side sealing is started before the trailing end of the load has cleared the seal-cut-seal bars the load must be stopped for a few seconds when the trailing end is clear of the seal-cut-seal bars to make the seals and cut-off at the trailing end, thereby interrupting the side sealing with the possible melting of the plastic film by the heated side-sealing rollers. However, as above indicated, the side sealer may be in a position to start closing and sealing the film sheets together at the sides before the load has cleared the seal-cut-seal bars, which may be necessary in some cases because of space limitations.

The preferred method of side sealing is illustrated in FIGS. 12 to 18, and FIG. 19 shows a modification to adapt the apparatus for use where the side seaming is physically close to the seal-cut-seal bars whereby it may begin the sealing at the sides before the sealing operation has been completed at the trailing end.

In FIGS. 12, 13, 14 and 16 the seal-cut-seal bars are shown at the left and the load or package with the sealed ends moves toward the right. The receiving conveyor 2a is of course, at a slightly higher level than the lower seal-cut-seal bar assembly when this bar is in its lowermost position. At the discharge end of the 2a there is a roller table or conveyor 2b with idle rollers, and following this is a continuously driven endless chain conveyor 2c which is usually close to the entrance to a heat-shrink oven (not shown) through which the wrapped load is carried to shrink the film and complete the package after it has been side-seamed. Conveyor 2c is normally driven independently of conveyor 2a. The three units 2a, 2b, and 2c comprise together a receiving conveyor system or means for the purposes herein described.

It should be kept in mind that the film sheets are wider than the load so that with the load centered on the pass line through the machine, the film sheets have margins along each side that are to be folded against the sides of the load in overlapping relation. The margins of the top sheet tend to drape down along the sides of the load and the margins of the bottom sheet are supported on the conveyor 2a or side supports 2d as shown. At the left of FIG. 13 the leading end of the load L2 as it is approaching the side closing and sealing devices is shown with the margins of the film sheets on the side supports 2d and the front end seal is here designated S3.

There is a fixed overhead bar 120 extending transversely over the roller conveyor 2b intermediate its ends. It is carried by uprights 121 at each side of the conveyor frame. On the bar 120 are spaced clamping guides 122 (See FIG. 13) by means of which horizontal rods 123 are fixed on the bar 120 for adjustment in a fore and aft direction. Each rod 123 has a vertical guide-clamp 124 (See FIG. 14) through which is passed a vertical rod 125 for vertical adjustment. Two rods are shown and there are two vertical rods 125.

The vertical rods 125 provide hangers for a transverse rod 126 (See FIG. 15) from which are pivotally hung plastic or metal plates 127. The lower edges of these plates are slightly curved at 128 in a direction toward which the load L2 is traveling. These plates are adjusted so that their lower edges normally extend into the path of travel of an approaching load and the adjustable clamping guides enable them to be adjusted to the most favorable location for a particular size of load. As the forward end of the load strikes the plates 127 it raises them in an arc and the curved edges thereof press against the top sheet of plastic film and smoothes it down and gently restrains it, keeping it taut. While two plates are shown, often one plate the full width of the load may be substituted.

Near each end of the transverse rod 126, there is an arcuately adjustable clamping guide 129 that can be moved along rod 126 and also rotated to a desired angle on the rod. It has a guide sleeve 130 in which is a rod 131 that is clamped therein for vertical adjustment. This rod is sloped in the direction of travel of the loads and has a lower foot portion 132 that is even less steeply inclined. We term these rods "corner-folding rods." The feet portions 132 of the rods are positioned and located where they will contact the seamed forward margin portions of the two sheets on the leading end of the load after it has passed under the flaps to fold the front end portions and then the longitudinal sides of the top film sheet against the sides of the load, in the manner illustrated in FIG. 16.

As most clearly seen in FIG. 14, there is a rod-like member 140 that is inclined downwardly and forwardly toward the direction of travel of the loads or packages at each side of the roller conveyor 2b, the forward end of each rod being flattened at 141 and fastened to the side supports 2d. As best seen in FIG. 13 these rods at opposite sides of the conveyor converge in the direction of travel of the loads, that is the lower flattened ends 141 are further apart than the higher other ends. The lower forward ends extend to a position just about to the plane of the rod on which swinging flaps or plates 127 are hung, the higher ends reach to a point over the chain conveyor 2c.

There is a rigid side plate 142 tight against the outside of each rod 140, the top edge of which is substantially flush with or slightly below the top of the rod against which it abuts for the greater portion of its length, except that just rearwardly of the toe portion 141 of each rod the edge of each plate has a hump 143 that rises above the level of the rod against which it is located. Also the high end of the plate 142 extends well above the level of the rod.

There is a sealing unit 145 positioned adjacent the high end of each of the rods 140 and its plate 142. This unit, shown in detail in FIGS. 17 and 18 comprises a base 146 secured to the machine frame. There is a lever 147 comprised of spaced upper and lower members 147a and 147b pivotally mounted between its ends on this base to oscillate in a horizontal plane. At one end of this lever there is a tension spring 148 adjustably anchored to a post 149 on the base so that the tension of the spring can be adjusted. There is a heated roller 150 at the other end of the lever beyond the end of the side plate 142. As clearly seen in FIGS. 14 and 16 the lever 147 with the roller 150 is located well above the base 146. Acutally, it is at about half the height of the load which is being wrapped.

As best seen in FIG. 17, the roller 150 is a metal roller fixed on a free turning pin 151 at the end of lever 147. The pulley has a wide periphery 152 and a web 153 secured to a hub on the pin 151. There is a fix ceramic or other insulating disk 154 non-rotatably fixed on the lever with an electric heater 155 mounted thereon where it radiates heat to the periphery and web of the roller. Flexible electric current supply wires are schematically indicated at 156. With this arrangement the roller is radiantly heated from a non-rotating electric heater.

The spring 148 resiliently urges the lever to the full line position shown in FIG. 18 where the periphery of the roller 150 is in the path of travel of a load or package traveling from the roller conveyor 2b onto the chain conveyor 2c, but enables the roller to be pushed back to the dotted line position in FIG. 18 where the roller then yieldably presses against the side of a passing load. A stop pin 157 limits the range of movement of the lever 147 under the tension of spring 148.

The general operation of the side sealing apparatus may be readily followed. The load L2 having had the plastic sheets applied thereto and sealed at both ends will be moving over the roller conveyor 2b and the top sheet of plastic will be smoothed down and held by the flaps 127. Next the feet portions 132 of the corner-folding rods 131 contact the forward corners of the seam S3 at each side of the load and they are folded back against the sides of the load. At the same time the rods 140 and their associated side-confining plates 142, being in the path of the forwardly moving margins of the bottom sheet of film lift these margins progressively higher at each side of the load causing them to be folded in toward the sides of the load while the converging angles of the rods and plates press and hold the margins of the bottom sheet into tight overlapping contact with the margins of the top sheet which are already tightly folded against the sides of the load by the corner folders 131–132. For some reason, the humps 143 on the side plates 142 significantly improve the in folding of the margins of the lower film sheets. The overlapping marings of the films are confined against the sides of load as the load clears the high ends of the confining plates 142 and they are immediately contacted by the hot roller 150 pressing under spring pressure against the overlapping film sheets to seal them together.

As the operation proceeds the load L2 will have cleared the conveyor 2a and will then continue to be carried forward by chain conveyor 2c. The sealing operation may thus continue without a break even though the conveyor 2a may be operating intermittently each time the seal-cut-seal bars are closed. With shorter packages one package may push another through the side-sealing arrangement. As a precaution against the film slipping down between the bar 140 and the adjacent side wall of the package, there is a short narrow ledge or shelf 2e inside the roller conveyor frame at each side in the area where the load is transferring from the roller conveyor to the chains and before the overlapping sides have been sealed together.

By transferring each partially wrapped load from an intermittently moving conveyor 2a which is briefly stopped when the frame A is being shifted to bring fresh rolls of film into place on the pass-line as previously described and during seal-cut-seal operation at the trailing end of each load or package, to the continuously moving chain conveyor 2c over a short roller conveyor 2b the successive loads can move through the side sealer at a substantially uniform rate without the travel of any load being stopped. The importance of not stopping is that the heated rollers 150 would quickly melt the overlapping side margins of the sheet if the load did not continuously move.

Where continuous travel of the load may not be arranged for, as for example where there is a space limitation that will not allow for a relatively long travel of the load between the seal-cut-seal bars and the side seaming apparatus, the modification shown in FIG. 19 may be employed. This unit 145' is generally similar to FIG. 18 and similar to reference numerals have been used to designate corresponding parts. However, in this construction the lever 147 has an extension 147a thereon at the same side of the pivot as the spring 148. There is a solenoid 160 with an armature 161 which is pivotally connected through link 162 with the extension 147a. With this arrangement the solenoid armature (which is here shown in the position to which it is moved when the solenoid is energized) acts instantly with the stopping of the travel of the load be sealed. In so doing, the armature 161 moved its full limit to the left as viewed in FIG. 19. This has rocked the lever 147 in a direction opposed to the force of the spring 148 to move the roller 150 away from the load and the overlapping sheets of film at the sides of the load, and the roller will not contact the overlapping films until the solenoid is deenergized.

We claim:

1. Shrink wrapping apparatus comprising:
  a. opposed seal-cut-seal bars each of which is movable toward and away from the other in a vertical plane between a fully separated position and a closed position at a level intermediate their respective fully separated positions, means for moving them simultaneously between their fully separated and their closed positions,
  b. a delivery conveyor means having a discharge end adjacent one side of the plane of movement of said bars and a receiving conveyor means having a receiving end adjacent the other side of said plane with a receiving end in confronting alignment with the discharge end of the delivery conveyor means, the conveyor means being so arranged that a load to be wrapped may be moved from the delivery conveyor across said plane when the bars are separated onto the receiving conveyor means and stopped when the trailing end of the load has cleared said plane so that the seal-cut-seal bars may then operate to close and then open,
  c. an upper shrink film roll holder located above the delivery conveyor and a lower shrink film roll holder below the delivery conveyor means, each such holder being arranged to hold a roll of film wider than the load to be wrapped to provide side margins at each side of the load,
  d. a pair of pinch rolls arranged to unwind film from a roll of film in the upper roll holder and deliver it into the plane of movement of the seal-cut-seal bars and a second pair of pinch rolls arranged to unwind film from a roll of film in the lower roll holder into said plane,
  e. power-driven means for driving both pairs of pinch rolls in unison and at the same speed and unwind film from each of the rolls at the same linear speed,
  f. the seal-cut-seal bars being arranged to join the leading ends of the upper and lower film sheets in the plane in which the bars move and at said level where they come together intermediate their fully separated positions whereby the leading end of a load moving from one cnoveyor means to the other contacts the joined ends of the film sheets intermediate the top and bottom of the load and carries them along with the lower sheet under the load and the upper sheet above the load, said bars being operable at the trailing end of the load to seal the two sheets together along two spaced parallel lines and sever the two sheets across their width between said parallel lines,
  g. means extending along the receiving conveyor means arranged to fold the side margins of the upper and lower film sheets into overlapping relation against the sides of the load and fuse them together as the load is moving along the receiving conveyor means,
  h. said means for fusing the overlapping side margins together comprising a heated roller supported for rotation about a vertical axis at each side of the receiving conveyor means past which successive loads with film applied thereto move, and means resiliently urging said heated rollers laterally against the overlapping margins of the film at the sides of the load; and
  i. means for smoothing the film at the top of the load in advance of the heated roller comprising pivoted plate means suspended across said receiving conveyor means and arranged to normally project into the path of a load moving along on said conveyor means and be moved thereby in a vertical arc to rest on the plastic film over the top of the moving load.

2. Shrink film wrapping apparatus as defined in claim 1 wherein there is also a rod supported above the receiving conveyor means at each side thereof, each rod being positioned to press the seamed film sheets at the front end of the load and cause them to be pushed back by the upward movement of the load and thereafter progressively press the side margins of the upper plastic sheet downwardly along the side of the moving load and wherein the means for folding the side margins of the lower sheet at each side of the load comprises an inclined surface extending lengthwise of the conveyor means and which slopes upwardly in the direction of travel of the loads on the conveyor means and so located in the path of the margins of the sheet of film at the respective sides of the loads for progressively lifting said margins as the load moves therealong, said inclined surfaces being also angled in the direction of travel of the loads whereby they both lift the margins of the lower sheet but fold them vertically inwardly against the sides of the load.

3. Shrink film wrapping apparatus as defined in claim 2 where each of said inclined surfaces has an upwardly rounded hump near its lowermost end.

4. Shrink film wrapping apparatus as defined in claim 3 in which the inclined surface has a rounded hump near its lowermost end.

5. Shrink film wrapping apparatus as defined in claim 3 in which said inclined surface is provided by a rigid rod-like member with a thin flat longitudinally-extending plate secured to said side of the rod which confronts the loads that are carried by the receiving conveyor means past it, the top edge of the plate sloping in the same direction as the inclined rod-like member and at the same angle except that near its lowermost end it has a hump that rises above the rod-like member and then recedes to the level of said member.

6. Shrink film wrapping apparatus as defined in claim 1 wherein said opposed seal-cut-seal bars are carried in a relatively fixed frame arranged transversely to the pass line of the successive loads to be wrapped through the apparatus, wherein said upper shrink film roll holder and lower shrink film roll holder are in a second frame separate from said fixed frame and are arranged to be moved transversely of said pass line into and out of operative position, and there is a second upper shrink film holder and a second lower shrink roll holder in the second frame alongside the first ones, respectively, which can be brought into position over said pass line when the second frame is moved transversely to move one set of roll holders out of operative position, the upper and lower pairs of pinch rolls and their power drive being also mounted on said fixed frame.

7. Shrink film wrapping apparatus as defined in claim 1 wherein said opposed seal-cut-seal bars are carried in a relatively fixed frame arranged transversely to the pass line of the successive loads through the apparatus and wherein said upper shrink film roll holder and lower shrink film roll holder are mounted in an elongated shuttle frame arranged to be shifted transversely through a limited range of travel to one side or the other of said pass line, said shuttle frame having an upper and a lower shrink-film roll holder at each end thereof whereby upper and lower rolls of film in said roll holders at one end or the other of said frame may be alternately moved to position across the pass line in operating position in front of the seal-cut-seal bars.

8. Shrink film wrapping apparatus as defined in claim 7 wherein power means is provided to effect the movement of the shuttle frame between one limit of movement and the frame and the other.

9. Shrink film wrapping apparatus as defined in claim 7 wherein said shuttle frame and roll holders are arranged for lowering of rolls of film into both the upper and lower holders vertically from an overhead position and wherein the movement of the shuttle frame from one limit to the other is effected while the delivery conveyor remains in fixed position.

10. Shrink film wrapping apparatus as defined in claim 7 wherein one roll of each pair of pinch rolls is supported in the relatively fixed frame in which the seal-cut-seal bars are carried, and wherein the shuttle frame has the other upper roll of each pair of pinch rolls and the other lower roll of each pair of pinch rolls duplicated, one upper and one lower being at one end of the shuttle frame and the other upper and lower ones being at the other end of the shuttle frame, the said means for driving the pinch rolls in unison being mounted on the fixed frame and arranged to drive the upper and lower rolls in said fixed frame.

11. Shrink film wrapping apparatus as defined in claim 10 wherein there are means arranged to move one pinch roll of each pair out of operative relation with the other when said shuttle frame is to be shifted.

12. Shrink film wrapping appratus as defined in claim 10 wherein the upper pinch roll on said fixed frame and the lower pinch roll on said fixed frame are supported for limited movement toward and away from the upper and lower pinch rolls respectively which they confront in the shuttle frame, and means for effecting such movement whereby one pinch roll of each pair may be separated from its confronting roll when the shuttle frame is to be moved and restored to operative relation with the confronting roll after said shift has been completed.

13. Apparatus for applying a shrink film to an article to be wrapped in such film comprising:

a. a relatively fixed frame having vertically-movable seal-cut-seal bars therein and means for raising and lowering said bars to open and close them, b. means positioned in front of said frame and means to the rear of said frame for supporting an article to be wrapped as it is moved from a position in front of the plane of movement of said bars between the bars when they are open to a position beyond said plane of movement thereof, the pass line of articles being so moved being horizontal and at right angles to the plane of movement of the bars, c. an elongated frame for supporting two axially aligned upper rolls of film and two axially aligned lower rolls of film, said frame being supported for movement in a limited range transversely of the pass line through the apparatus for alternately utilizing film from one upper and one lower roll at one end of the frame and then the other end, and d. means arranged to feed film from the selected pair of upper and lower film rolls to the said pass line where said ends are fused together.

14. Apparatus as defined in claim 13 wherein the shrink film is delivered from the rolls of film through two pairs of pinch rolls, one pair operating to remove film from an upper roll on the film roll supporting means and the other from the lower film roll supporting means as the upper one, each pair of pinch rolls comprising a power-driven roller in said fixed frame and one of two duplicate axially-aligned pinch rollers on said movable film roll supporting means.

15. In an apparatus for wrapping one or more objects in shrink-wrap film wherein the load to be wrapped is first enclosed between upper and lower plastic film sheets sealed together at each end of the load with the film sheets being wider than the load to provide side margins that may be folded into overlapping relation and sealed along the sides of the load, the invention comprising:

a. conveyor means on which the package is supported and carried along during and after the load has been enveloped between the two sheets which are sealed together at the leading and trailing ends of the load, b. means supported above the conveyor means for egaging the sealed margins of the film sheets at the front of the load and folding the portions so engaged back against the respective sides of the loads and thereafter folding the side margins of the top film sheet down against the sides of the load, said means comprising a bar member fixed above the conveyor means at each side of the path of travel of the load as it is moved by said conveyor means, said bar member being sloped downwardly and forwardly in the direction of travel of the load and positioned where it is close to but clears that side of the load adjacent which it cooperates in making the folds, and c. a depending plate suspended crosswise above the conveyor means pivoted to swing in a vertical arc and so arranged that its lower edge is lifted when contacted by the load moving therebeneath to slide on the upper film sheet as the load moves under it to smooth said film sheet.

16. In the wrapping of one or more objects in shrink film, wherein the load to be wrapped is moved against the joined ends of upper and lower continuous film that is wound on rolls and with the continued movement of the load one sheet trails along on top of the load and the lower one trails along in under the load with the said films being fused together at the other end of the load, then by operation of seal-cut-seal cut off means the films are cut off and the cut ends sealed together to be engaged by a succeeding load, the steps which comprise:

a. mounting two lower rolls of film in end-to-end relation in a movable frame arranged to be moved transversely across the pass line of successive loads through the machine and mounting two upper rolls of film in end-to-end alignment above the lower ones.

b. moving said frame transversely of the pass line when the upper and lower rolls at one end of the frame require replacement to thereby bring the other two upper and lower rolls of film into position on the pass line and replacing the upper and lower rolls with new rolls while said two rolls then positioned on the pass line are being consumed, c. fusing the leading ends of the sheets of film in said replacement rolls together with a portable sealer whereby said ends are joined ready for operation when the frame is again shifted, and d. similarly repeating the movement of the frame as the rolls at one end and then the other require replacement and joining the ends of each pair of replacement upper and lower rolls of film at one side of the pass line before said rolls are moved into position to be used.

17. In combination with a shrink-film wrapping appratus wherein one web of shrink-wrap film is supplied from an upper roll, the film rolls being supported in a first frame having roll holders therein and wherein there are opposed seal-cut-seal bars oppositely movable in a vertical plane between an open position where a load to be wrapped may pass between them to a closed position where they engage the web of film from the upper roll and the web of film from the lower roll to form a first transverse seam at the trailing end of one load being wrapped, sever the two films on a line across their full width immediately following said first seam and simultaneously fuse the ends of the two films following the line where they are severed into a second transverse seam for the leading end of the next load to be wrapped, the apparatus having a delivery conveyor at one side of the plane in which the seal-cut-seal bars are located for moving a load to be wrapped between said bars when they are open and a receiving conveyor at the other side of said plane for receiving a load to be wrapped from the delivery conveyor, the load in passing between said bars contacting the joined ends of the two webs of film and drawing it along horizontally with one web over the load and one under it with the film having a transverse width greater than the width of the load and with the rolls being so positioned that the load is centered on the common center line of the two rolls of film so that both the upper and lower web have a side margin along each side of the load at both its top and bottom, the seal-cut-seal bars being mounted in a second frame in which there are also mounted pinch roll means for withdrawing film from both the upper and lower rolls at the same speed and at a linear speed substantially equal to the speed of travel of the load as it is moved from the delivery conveyor onto the receiving conveyor, said receiving conveyor being arranged to operate intermittently whereby it may stop after the load has been received thereon while the seal-cut-seal bars are closing to form the seam at its trailing end, a. a roller table onto which a load is transferred from the receiving conveyor, b. a third conveyor which is a continuously-operating conveyor for receiving a load from the roller table and continuously moving it at a uniform speed, c. means following said receiving conveyor for folding the margins of the upper and lower films which now envelop the load and are sealed together at each end of the load vertically against the sides of the load, said means including a fixed guide at each side of said third conveyor angled upwardly and inwardly in the direction of travel of the load, d. a heated roller rotatable about a vertical axis at each side of the load at the higher end of the fixed guide and above said third conveyor so arranged as to yieldably press the overlapping films against the sides of the load and heat-seal them while the continuous travel of said third conveyor keeps the load in motion, and e. means for withdrawing the heated roll from contact with the film at the sides of the load should the travel of the third conveyor be stopped.

* * * * *